(12) United States Patent
Negishi et al.

(10) Patent No.: US 8,181,666 B2
(45) Date of Patent: May 22, 2012

(54) SWITCH VALVE

(75) Inventors: Toshio Negishi, Chigasaki (JP);
Tatsuhiko Koshida, Chigasaki (JP)

(73) Assignee: Ulvac, Inc., Chigasaki-shi (JP)

( * ) Notice: Subject to any disclaimer, the term of this patent is extended or adjusted under 35 U.S.C. 154(b) by 0 days.

(21) Appl. No.: 12/868,121

(22) Filed: Aug. 25, 2010

(65) Prior Publication Data

US 2011/0048563 A1    Mar. 3, 2011

Related U.S. Application Data

(63) Continuation of application No. PCT/JP2009/053580, filed on Feb. 26, 2009.

(30) Foreign Application Priority Data

Feb. 26, 2008  (JP) ................................. 2008-044350

(51) Int. Cl.
*F16K 13/10* (2006.01)
*F16K 11/04* (2006.01)
(52) U.S. Cl. ................................. 137/251.1; 137/625.48
(58) Field of Classification Search .............. 137/251.1, 137/625.48, 606, 862
See application file for complete search history.

(56) References Cited

U.S. PATENT DOCUMENTS

| | | | | |
|---|---|---|---|---|
| 338,112 A * | 3/1886 | Smith | ........................ | 137/251.1 |
| 400,177 A * | 3/1889 | Bell | ............................ | 137/251.1 |
| 644,110 A * | 2/1900 | Strache | ....................... | 137/251.1 |
| 1,436,174 A * | 11/1922 | Johansson | .................. | 137/251.1 |
| 2,009,218 A * | 7/1935 | Wiegand et al. | ........... | 137/251.1 |
| 2,374,531 A * | 4/1945 | Flory | .......................... | 251/129.1 |
| 4,612,959 A * | 9/1986 | Costello | ..................... | 137/251.1 |
| 6,575,188 B2 * | 6/2003 | Parunak | ..................... | 137/251.1 |

FOREIGN PATENT DOCUMENTS

| | | |
|---|---|---|
| JP | 34-1935 | 4/1959 |
| JP | 39-3485 | 4/1964 |
| JP | 49-73836 | 6/1974 |
| JP | 49-93424 | 8/1974 |
| JP | 52-21027 | 2/1977 |
| JP | 54-85526 | 6/1979 |
| JP | 59-80571 | 5/1984 |
| JP | 2000-65242 | 3/2000 |
| JP | 2001-523768 A1 | 11/2001 |
| JP | 2003-525349 A1 | 8/2003 |
| JP | 2004-204289 A1 | 7/2004 |
| JP | 2005-29885 A1 | 2/2005 |
| JP | 2006-111920 A1 | 4/2006 |

OTHER PUBLICATIONS

International Search Report for International Application No. PCT/JP2009/053580 dated May 13, 2009.

* cited by examiner

*Primary Examiner* — John Rivell
(74) *Attorney, Agent, or Firm* — Kratz, Quintos & Hanson, LLP

(57) ABSTRACT

A switch valve having a long span of life is provided. The switch valve 70 of the present invention has a low-melting-point metal 76 having a surface on which a blocking member contacts, with the low-melting-point metal 76 melted, thereby a closed state appears in which an inner space of the switch valve 70 is split up into an inner space and an outer space of the blocking member 72. When the inner space and the outer space of the blocking member 72 are connected in the inner space of the switch valve 70, outside devices are blocked from each other in the closed state. The outside devices are connected to each other in an opened state in which the lower end of the blocking member 72 is spaced away from the low-melting-point metal 76.

4 Claims, 6 Drawing Sheets

SWITCH VALVE

This application is a continuation of International Application No. PCT/JP2009/053580 filed Feb. 26, 2009, which claims priority to Japanese Patent Document No. 2008-044350, filed on Feb. 26, 2008. The entire disclosure of the prior application is herein incorporated by reference in their entireties.

BACKGROUND OF THE INVENTION

1. Field of the Invention

The present invention relates to a switch valve; and in particular, the invention relates to a switch valve to be used for switching between start and stop in feeding a gas.

2. Description of Background Art

The switch valves have been conventionally used in switching between the feeding start and the feeding stop of gases.

In FIGS. 7(a) and (b), a reference numeral 200 shows a switch valve, and the switch valve 200 has a partition wall 211 and a valve body 221.

The partition wall 211 is provided with a hole 212 with which the valve body 221 is fitted.

The valve body 221 is attached to a moving unit (not shown); and when the valve body 221 is seated on the hole 212 by the moving unit, a surface of the valve body 221 closely contacts an inner wall surface (valve seat face 215) of the hole 212, and one space and the other space are separated across the partition wall 211, thereby attaining a closed state (FIG. 7(b)).

When the valve body 221 is removed from the hole 212 and the surface of the valve body 221 is spaced from the valve seat face 215, the one space is connected to the other space across the partition wall 211, thereby attaining an opened state (FIG. 7(a)).

The switch valves 200 are widely used for switching between the feeding start and the feeding stop of fluids (such as gases, liquids or the like).

In general, the partition wall 211 and the valve body 221 of the switch valve 200 are constructed of a metal, ceramic or the like. When such a switch valve 200 is repeatedly opened and closed, an engaging portion between the valve body 221 and the partition wall 211 is abraded, sealing performance of the switch valve 200 is not only deteriorated, but also dust is generated to cause contamination of the fluid.

In addition, when the on-off operation is repeated at a high temperature (240° C. to 400° C.), sealing faces are damaged, so that the sealing performance of the valve may be lost.

See, Japanese Patent Documents JP-A 2001-523768, JP-A 2003-525349, JP-A 2004-204289, JP-A 2005-29885, and JP-A 2006-111920.

SUMMARY OF THE INVENTION

The present invention is aimed at solving the above problems; and its object is to provide a switch valve which has a long span of life without contaminating a fluid. In addition, the present invention is to provide a switch valve which has a long span of life without losing sealing performance even when it is repeatedly opened and closed at high temperature.

In order to solve the above problems, an embodiment of the present invention may be directed to a switch valve, the switch valve having an enclosure, a connection opening, a first on-off opening and a second on-off opening. The connection opening and the first and second on-off openings are for respective communication with an interior and an exterior of the enclosure. The switch valve is made to be switchable between a first state, in which a gas is able to pass through the interior of the enclosure between the first on-off opening and the connection opening, with the second on-off opening closed, and a second state, in which the gas is able to pass through the interior of the enclosure between the second on-off opening and the connection opening, with the first on-off opening closed. The switch valve includes: a first vessel and a second vessel, disposed inside the enclosure, and first and second tubular blocking portions, disposed inside the enclosure, which are able to be inserted into and pulled away respectively from the first and second vessels, wherein the melted low-melting-point metal is disposed in the first and second vessels, wherein the first and second vessels are designed to be able to move up and down inside the enclosure, wherein when the first vessel is located at a lower part inside the enclosure, the first blocking portion is pulled away from the first vessel, and the second blocking portion is inserted into the second vessel to contact the melted low-melting-point metal, so that the second on-off opening is blocked by the second blocking portion, thereby it becomes the first state. When the first blocking portion is located at an upper part inside the enclosure, the first blocking portion is inserted into the first vessel in order to contact the melted low-melting-point metal, so that the first on-off opening is blocked by the first blocking portion, and the second blocking portion is pulled away from the second vessel, thereby becoming the second state.

The present embodiment may be directed to a switch valve, wherein the second blocking member is provided in the first vessel, an opening of an upper end of a pipe inserted into the second vessel being the second on-off opening.

The present embodiment may be directed to a switch valve, which comprises a heating means to heat the low-melting-point metal.

The present embodiment may be directed to a switch valve, wherein the low-melting-point metal is one or more kinds of metals selected from the group consisting of indium, tin, and an indium tin oxide alloy.

Since the present invention is constructed as discussed above, if a pressure difference is formed between the first and second connection space, the gas is fed from the space on a higher pressure side to the other space on a lower pressure side of the first and second connection spaces, in the opened state where the blocking member is spaced from the low-melting-point metal.

To the contrary, feeding of the gas is stopped in the closed state where the blocking member is made to contact with the low-melting-point metal. In this way, the switch valve of the present invention is arranged in the middle of the gas feeding pathway so that it may be used for switching between the feeding start and the feeding stop of the gas.

The space on the high pressure side is an inner space of a high pressure unit (such as, a gas generating device, a gas bomb or the like); and the space on the low pressure side is an inner space of a low pressure device (such as, a shower plate, a vacuum chamber or the like). The gases which can be switched between the starting and the stopping of feeding are: a vapor of a vapor deposition material; an etching gas; a CVD gas; a purge gas; a sputtering gas or the like.

In addition, a vacuum chamber to be used for forming a film or the like may be the space on the high pressure side, and a vacuum evacuation system may be the space on the low pressure side, so that the switch valve may be used for switching between evacuation starting and evacuation stopping of a gas.

If the pressure difference formed between the first and second connection spaces is too large, the low-melting-point metal could be blown off to spill from the receiving member, when the switch valve is set to the opened state, so that the pressure difference needs to be kept at such a level that the low-melting-point metal may not be blown off.

EFFECTS OF THE INVENTION

Since the lower end of the blocking member closely contacts the melted metal without a gap, the gas blocking performance is higher than that in a case where it contacts a solid. Furthermore, even when the switch valve is repeatedly opened and closed, the lower end of the blocking member is not abraded, so that the switch valve has a long span of life. Moreover, because even with the repeated opening and closing does not cause the dust to be generated, no dust is mixed into the gas passing through the interior of the switch valve. Even if the switch valve is used in a process at a high temperature, the sealing part is difficult to be damaged, which means that a switch valve having a long span of life can be provided.

DETAILED DESCRIPTION OF THE INVENTION

Figure 1:
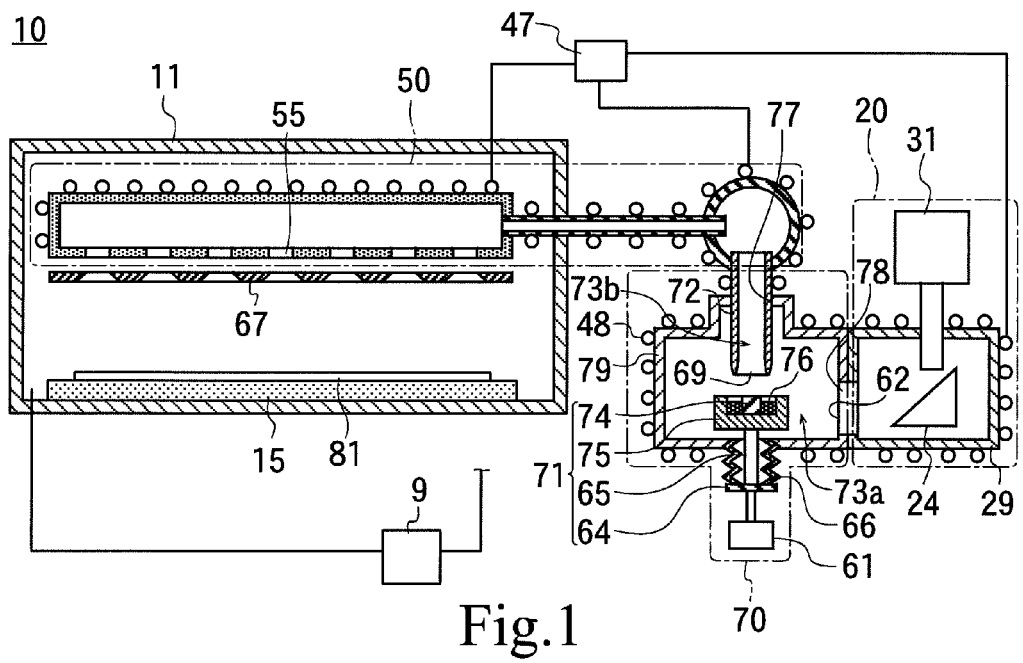
FIG. 1 is a sectional view showing one embodiment of a film forming apparatus which uses the switch valve of the present invention.

The switch valve of the present invention has a housing which is an enclosure, and an on-off opening and a connection opening which is communicated with the interior portion and the exterior portion of the housing, respectively, so that switching is performed between a connected state in which a gas can pass through the inside of the housing between the on-off opening and the connection opening, and a blocked state in which the on-off opening is blocked from the connection opening. The enclosure is designed to be gas-tight, and can be evacuated to vacuum.

The switch valve of the present invention is arranged inside the housing, and has a vessel which is arranged inside the housing and in which a solid and a liquid can be placed, and a blocking member arranged inside the housing.

The vessel and the blocking member are designed to be able to move relatively, and the blocking member is designed such that it is able to be inserted into and pulled away from the vessel. The on-off opening is surrounded by either the blocking member or the vessel.

A low-melting-point metal can be placed in the vessel. When a melted metal is formed by melting the low-melting-point metal which is placed in the vessel, by inserting the blocking member into the vessel, the blocking member contacts and is immersed into the melted metal, so that the on-off opening is closed in a state such that the on-off opening is surrounded with a contacting portion and an immersed portion. By pulling the blocking member away from the inner portion of the vessel, the blocking member is spaced away from the melted metal, and the on-off opening is opened.

The pipe is gas-tightly inserted into the housing; a tip of the pipe inside the housing is directed downwardly; and the vessel is arranged under the on-off opening. The housing is provided with a connection opening; and when an opening of the tip of the pipe inside the housing is taken as the on-off opening, the on-off opening and the connection opening are connected when the tip of the pipe is spaced away from the melted metal inside the vessel. Further, when the surrounding portion of the on-off opening of the pipe within the housing is taken as the ring-shaped blocking member, by making the vessel and the pipe relatively move, the entire circumference of the blocking member contacts with and is immersed into the melted metal inside the vessel, the pipe is closed, and the on-off opening and the connection opening are blocked from each other.

On the other hand, when the pipe is gas-tightly inserted into the housing, the tip of the pipe inside the housing is directed upwardly, and the circumference of the tip of the pipe is surrounded with the vessel, the opening at the tip of this pipe becoming the on-off opening. When a tubular blocking member being a ring-shaped projection is formed gas-tightly on a bottom face of a lid member being a lid, without passage of the gas, the melted metal inside the vessel which surrounds the on-off opening contacts the blocking member along the entire circumference of the on-off opening outside the on-off opening and the blocking member is immersed therein; consequently, the on-off opening is covered and closed with the lid member and the blocking member. When the housing is provided with a connection opening, the on-off opening and the connection opening are blocked in such a state that the on-off opening is covered with the lid, whereas when the lid is opened by spacing the blocking member from the melted metal, the on-off opening and the connection opening are connected.

According to the present invention, a moving unit can be provided, which relatively moves the vessel and the blocking member as discussed above. It is only necessary to move either one or both of the blocking member and the vessel in order to perform opening and closing.

Figure 2:
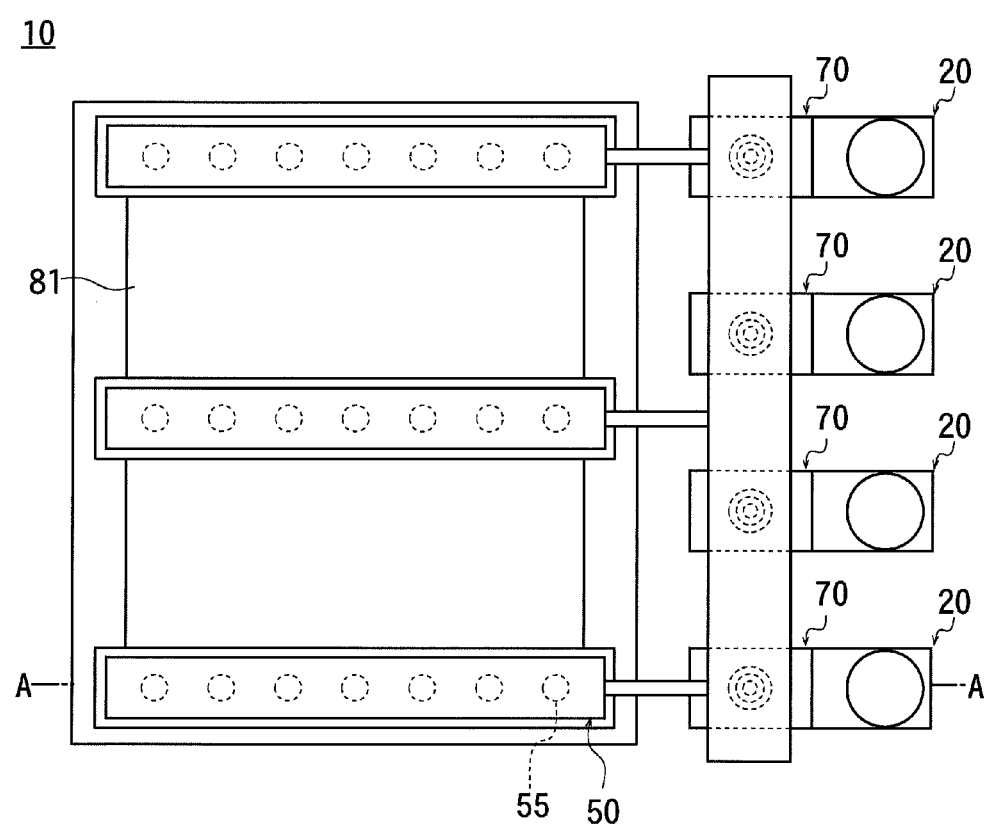
FIG. 2 is a schematic diagram showing a plan view of one embodiment of a film forming apparatus which uses the switch valve of the present invention.

In FIG. 2, a reference numeral 10 is one example of a film forming apparatus with the switch valve 70 used in the first embodiment of the present invention. FIG. 1 corresponds to a sectional view of FIG. 2 cut along an A-A section line.

The switch valve 70 has a low-melting-point metal 76, a receiving member 71, an enclosure 79, a blocking member 72, and an extensible member 66. The enclosure 79 is arranged such that at least part of it is located above an opening of the receiving member 71.

In this embodiment, the enclosure 79 is in a box shape, with an opening formed at a bottom face. A receiving member 71 has a supporting plate 64 which is arranged under the enclosure 79, a supporting shaft 65 which is set upright on a surface of the supporting plate 64 and has a tip projected into the enclosure 79 through an opening at a bottom face of the enclosure 79, and a vessel 75 attached to the tip of the supporting shaft 65. An opening of the vessel 75 is directed upwardly, and a low-melting point metal 76 is placed inside the vessel 75.

An extensible member 66 is a bellows or the like in a tubular shape, and surrounds the circumference of the supporting shaft 65, and one end thereof is attached in a gas-tightly manner to the circumference of the opening of the enclosure 79 such that it surrounds the opening, whereas the other end is fitted to a surface of the supporting plate 64.

Therefore, one end and the other end of the extensible member 66 are connected in a gas-tightly manner to the enclosure 79 and the receiving member 71, respectively; and an inner space of the switch valve 70, which is constituted by an inner space of the enclosure 79, an inner space of the receiving member 71 and a space between the enclosure 79 and the receiving member 71, is blocked from an outer space (the airy atmosphere, for example) in a state such that a connection pipe 78 and a blocking member 72 as discussed below are tightly closed.

A heating unit 48 is fitted to either one or both of the enclosure 79 and the receiving member 71. When electronic current is applied from a power source 47 to the heating means 48 and either one of the member from the enclosure 79 and the receiving member 71 to which the heating means 48 is attached is heated, the other member is heated with radiation heat, so that both of the enclosure 79 and the receiving member 71 are ultimately heated by the heating means 48. The low-melting-point metal 76 is arranged inside the receiving member 71; and when the receiving member 71 is heated, the metal is heated to be melted or softened through heat conduction and with heat radiation.

An opening 77 is formed in the enclosure 79. The blocking member 72 is tubular (pipe), and one end (upper end) is gas-tightly connected to the opening 77 of the enclosure 79 so that a gas may not move between the blocking member 72 and the enclosure 79, while the other end (lower end) faces a surface of the low-melting-point metal 76 placed in the receiving member 71. In this embodiment, a part of the blocking member 72 is projected upwardly from the opening 77 of the enclosure 79 so as to facilitate connection of an outside device with it.

An opening of the lower end of the pipe constituting the enclosure 79 becomes an on-off opening 69, a tip portion of the pipe which surrounds the on-off opening 69 becomes the blocking member 72, and the opening 69 is opened and closed as discussed below.

The receiving member 71 is attached to moving unit 61. In this embodiment, the supporting plate 64 of the receiving member 71 is attached to the moving unit 61; and when the supporting plate 64 is moved up and down by the moving unit 61, the supporting shaft 65 and the vessel 75 are moved up and down. Thus, the entire receiving member 71 moves up and down.

When the receiving member 71 is made to move up and down by the moving unit 61, the extensible member 66 is contracted and extended, the receiving member 71 and the blocking member 72 move relatively, while an inner space of the switch valve 70 is being blocked from an outer space.

Figure 3A:
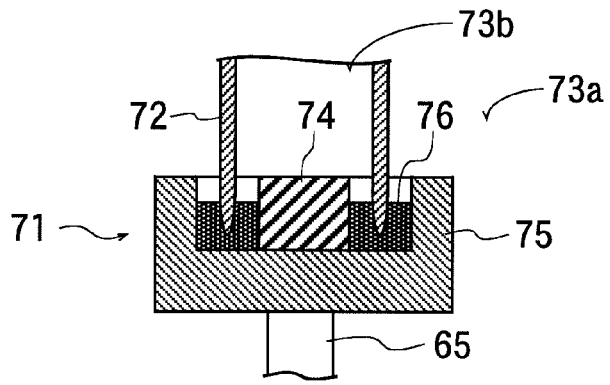
FIG. 3(*a*) is a sectional view illustrating a closed state, and FIG. 3(*b*) is a sectional view illustrating an opened state.

When a lower end of the blocking member 72 is brought into contact with the surface of the low-melting-point metal 76 placed in the receiving member 71 by moving the blocking member 72 toward the receiving member 71, a closed state is formed in which the inner space of the switch valve 70 is divided into a first inner space 73a which is outside the blocking member 72 and a second inner space 73b which is inside the blocking member 72 (FIG. 3(a)).

Figure 3B:
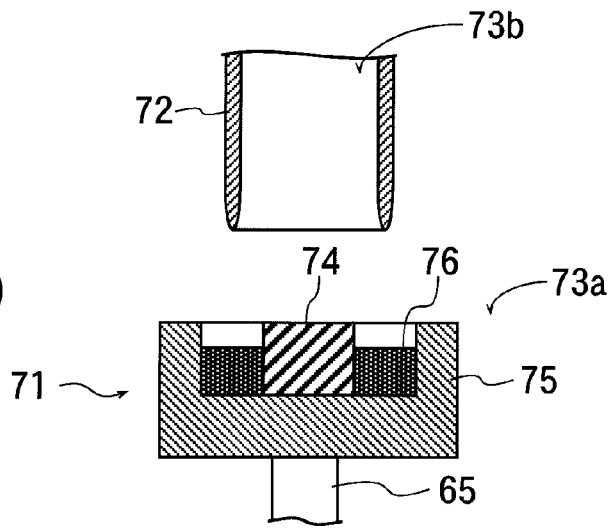

On the other hand, when the blocking member 72 is moved away from the receiving member 71 and the lower end of the blocking member 72 is spaced away from the surface of the low-melting-point metal 76, an opened state is formed in which the first and second inner spaces 73a, 73b are connected to each other and the inner space of the switch valve 70 is integrated (FIG. 3(b)).

The moving amount of the moving unit 61 is set such that in the closed state, the lower end of the blocking member 72 does not contact a bottom face of the receiving member 71 in which the low-melting-point metal 76 is placed, but is located between the bottom face and the surface of the low-melting-point metal 76. Thus, the blocking member 72 is immersed into the melted low-melting-point metal 76.

Even when the switch valve 70 is repeatedly opened and closed, the lower end of the blocking member 72 does not contact a solid (bottom face) which leads it to be free from abrasion, and in addition, its lower end certainly closely contacts the surface of the low-melting-point metal 76. Therefore, the first and second inner spaces 73a, 73b are certainly separated at the time of the closed state.

A through hole is formed in the enclosure 79, and a connection pipe 78 is formed by the through hole or a pipe inserted gas-tightly into the through hole.

An opening being one end of the connection pipe 78 faces the first inner space 73a and becomes a connection opening 62, and an opening of the other end is located outside the switch valve 70. Therefore, the connection pipe 78 connects the first inner space 73a and the outer space of the switch valve 70.

Further, the upper end of the blocking member 72 is extended in a gas-tightly manner to the outside of the switch valve 70. Therefore, the blocking member 72 connects the second inner space 73b and the outer space of the switch valve 70.

When each of end portions of the connection pipe 78 and the blocking member 72, which are to be connected to the outer space of the switch valve 70, are connected gas-tightly to outside devices, the respective first and second inner spaces 73a, 73b are connected to inner spaces of the outside devices. Since the switch valve 70 does not have an opening to connect the inner space to the outer space except for the blocking member 72 and the connection pipe 78, the inner space of the switch valve 70 is blocked from an outside atmosphere (for example, the air), with the switch valve 70 connected to the outside device.

The film forming apparatus 10 (vapor deposition apparatus) of FIG. 2 has discharging units 50, one or more vapor generating units (gas generating units) 20, and the switch valves 70, the number of switch valves being equal to or more than the number of the vapor generating units 20.

The switch valves 70 are arranged respectively between the vapor generating units 20 and the discharging units 50. Either the first or the second inner spaces 73a, 73b is connected to the vapor generating unit 20, and the other is connected to the discharging unit 50.

At least a part of the discharging unit 50 is arranged in a film forming chamber 11 made of a vacuum chamber, the discharging unit 50 being provided with discharging openings 55 which are formed in a portion which is located inside the film forming chamber 11, so that the inner space of the discharging unit 50 is connected to the inner space of the film forming chamber 11 through the discharge openings 55.

The vapor generating unit 20 has a heating chamber 29 made of a vacuum chamber; a mounting member 24 arranged inside the heating chamber 29; heating means 48 for heating both the heating chamber 29 and the mounting member 24i and a feeder 31 for disposing a vapor deposition material onto the mounting member 24.

A vacuum evacuation system 9 is connected to the heating chamber 29, the film forming chamber 11 and the switch valve 70. The inner space of the heating chamber 29, the inner space of the film forming chamber 11 and the inner space of the switch valve 70 are evacuated to vacuum by the vacuum evacuating system 9, thereby forming a vacuum atmosphere of a predetermined pressure (for example, $10^{-5}$ Pa).

The vapor deposition material is a material for an organic thin film of an organic EL element, for example. More specifically, it is an organic material which includes an electron transfer material, a light emitting material, a charge transfer material or the like.

In this embodiment, the heating means 48 is also attached to the discharging unit 50. The heating chamber 29, the mounting member 24, the discharging units 50, the enclosure 79, the receiving member 71 and the extensible member 66 are heated by applying electric current through the heating means 48; and they are kept at a heating temperature (240° C. or more and 400° C. or less) which is the same as or higher than the evaporating temperature at which the vapor deposition material evaporates and is the same as or lower than the decomposition temperature at which the vapor of the vapor deposition material is decomposed.

The melting point of the low-melting-point metal 76 is the foregoing heating temperature or less, and when the receiving member 71 is heated to this heating temperature, the metal becomes melted.

When the vacuum evacuation of the heating chamber 29 and the switch valve 70 are stopped and the vacuum deposition material is fed from the feeding means 31 to the mounting member 24 which has been heated to the heating temperature, in a state such that the film forming chamber 11 being continuously evacuated to vacuum, the vapor of the vapor deposition material is generated.

The inner space (the first inner space 73a in this embodiment) of the switch valve 70 is connected to the inner space of the heating chamber 29.

As discussed above, while the film forming chamber 11 is being evacuated to vacuum, the vacuum evacuation of the heating chamber 29 is stopped, and in addition, the vapor is generated inside the heating chamber 29, so that the pressure of the inner space of the heating chamber 29 is higher than not only the inner pressure of the film forming chamber 11 but also higher than the inner pressure of the discharging unit 50 connected to the film forming chamber 11.

When the switch valve 70 between the vapor generating unit 20 which generates the vapor and the discharging unit 50 is opened, and the heating chamber 29 of the vapor generating unit 20 is connected to the discharging unit 50, the vapor moves from the heating chamber 29 to the discharging units 50 passing through the switch valve 70 to be discharged into the film forming chamber 11 through the discharge openings 55 due to the pressure difference.

At this time, if the switch valve 70, which is between the discharging units 50 and the vapor generating units 20 other than the vapor generating unit 20 which generates the vapor, is closed, the vapor moves into the discharging units 50 without entering the other vapor generating units 20.

Since the discharging units 50, the receiving member 71, the extensible member 66, the enclosure 79, the low-melting-point metal 76 and the heating chamber 29 are kept at the foregoing heating temperature, the vapor which is generated in the heating chamber 29 does not precipitate in the middle of the pathway through which the vapor moves until the vapor is discharged from the discharge openings 55.

A substrate holder 15 is arranged inside the film forming chamber 11, and a substrate 81 is placed on the substrate holder 15 such that the substrate faces the discharge openings 55. The vapor discharged through the discharge openings 55 reaches a surface of the substrate 81 in order to form a thin film of the vapor deposition material on the surface of the substrate 81.

In this case, if a cooling plate 67 for shielding radiation heat from the discharging units 50 is provided between the substrate 81 on the substrate holder 15 and the discharging units 50, the substrate 81 is prevented from being damaged by the heat.

After the thin film is formed in a predetermined thickness on the substrate 81, the feeding of the material is stopped, and the switch valve 70 between the discharging units 50 and the vapor generating unit 20 which generates the vapor is closed. The vapor is freshly generated in the other vapor generating unit 20; and when the switch valve 70 between this vapor generating unit 20 and the discharging units 50 is opened, the freshly generated vapor is discharged through the discharging openings 55, and a thin film of the new vapor deposition material can be formed on the surface of the substrate 81.

Figure 4:
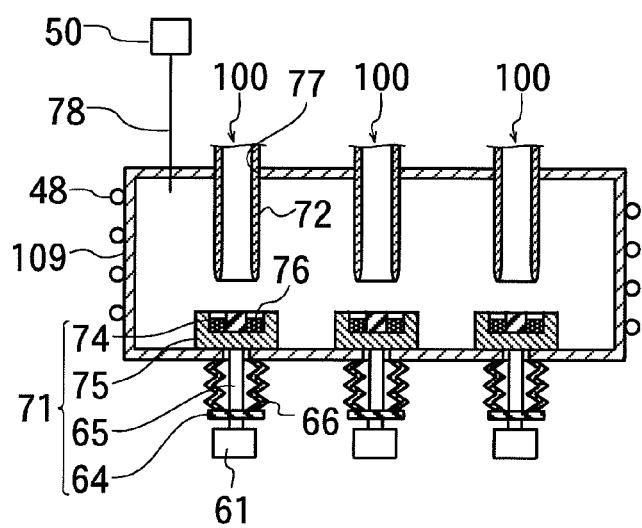
FIG. 4 is a sectional view illustrating the second embodiment of the switch valve.

Next, a second embodiment of the switch valve 100 of the present invention will be explained (FIG. 4).

The switch valve 100 of the second embodiment has the same structure as in the switch valve 70 of the above-discussed first embodiment except that a plurality of the switch valves 100 share an enclosure 109, and an explanation will be made with the same reference numerals that have been given to the same members.

In the switch valve 100 of the second embodiment, the enclosure 109 is fixed, and receiving members 71 are designed to move.

The enclosure 109 is in a shape of a box, and its bottom face is provided with openings in such a number that is equal to the number of the receiving members 71. The receiving member 71 has a supporting plate 64 arranged under the enclosure 109, a supporting shaft 65 set upright on a surface of the supporting plate 64 and with its tip projected inside the enclosure 109 through the opening at the bottom face of the enclosure 109, and a vessel 75 attached to the tip of the supporting shaft 65. An opening of the vessel 75 is directed upwardly, and the low-melting-point metal 76 is placed inside the vessel 75.

The extensible member 66 surrounds the circumference of the supporting shaft 65, one end is attached in a gas-tightly manner to the circumference of the opening of the enclosure 109 such that it surrounds the opening; and the other end is attached to the surface of the supporting plate 64, so that the inner space of the switch valve 70 is hermetically sealed.

The supporting plate 64 is attached to a moving unit 61, and when the supporting plate 64 is moved up and down by the moving unit 61, the supporting shaft 65 and the vessel 75 move up and down. Thus, the entire receiving member 71 moves up and down. When the receiving member 71 moves up and down, the extensible member 66 contracts and extends, so that the inner space of the switch valve 100 is maintained in a state of being blocked from the outer space.

Since the enclosure 109 is fixed, it is at rest relative to outside devices (the vapor generating unit 20 and the discharging unit 50, for example).

A connection pipe 78 and a blocking member 72 are also at rest relative to the outside devices, so that when the switch valve 100 is opened and closed, there is no load factor applied to a connection portion between the connection pipe 78 and the outside device, or a connection portion between the blocking member 72 and the outside device, even without providing a special member.

When the switch valves 100 in the second embodiment are attached to the film forming apparatus 10 in place of the switch valve 70 of the first embodiment, the connection pipe 78 is connected to the discharging unit 50, and the blocking member 72 is connected to the vapor generating unit 20. In the switch valves 100 of the second embodiment, the vapor generated in each of the vapor generating units 20 moves into the discharging units 50 through the inner space of the same enclosure 109.

In the above discussions, although the case in which the moving unit 61 moves the receiving member 71, the present invention is not limited thereto.

Figure 5:
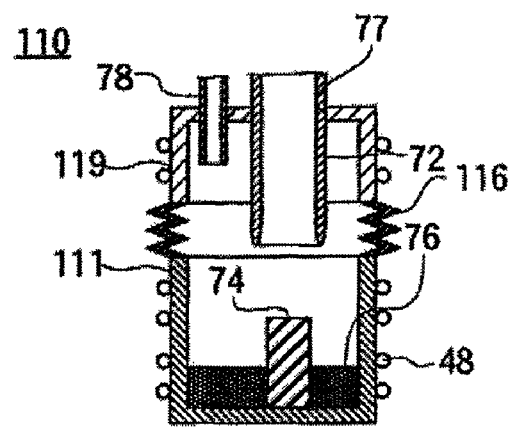
FIG. 5 is a sectional view illustrating the third embodiment of the switch valve.
Figure 6:
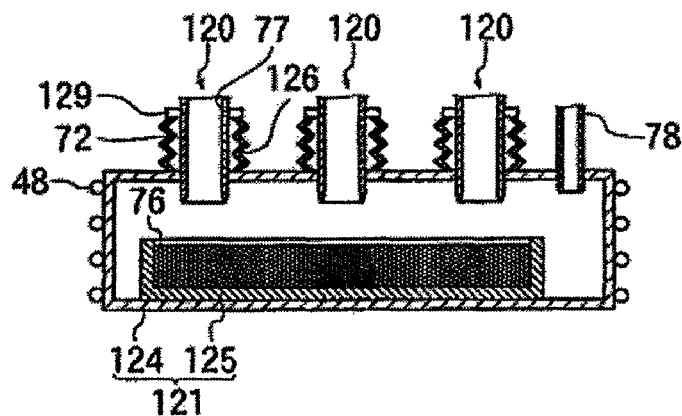
FIG. 6 is a sectional view illustrating the fourth embodiment of the switch valve.
Figure 7A:
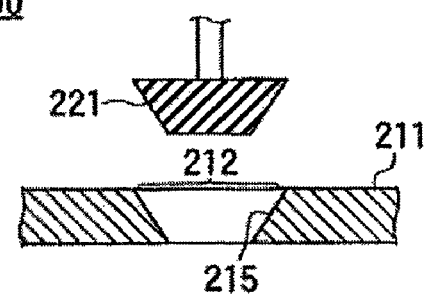
FIGS. 7(*a*) and (*b*) are sectional views for illustrating a switch valve in a conventional technology.
Figure 7B:
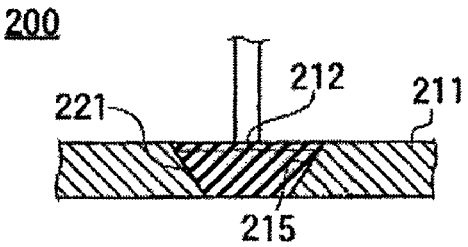

In FIGS. 5 and 6, reference numerals 110 and 120 denote switch valves of the third and fourth embodiments.

A difference between the third and fourth embodiments is that while each switch valve 110 has a corresponding receiving member (vessel) 111 in the third embodiment, a plurality of switch valves 120 shares one receiving member 121 in the fourth embodiment.

The low-melting-point metal 76 may be placed immediately in the receiving member 111 to which an extensible member 116 is attached, or may be placed in a vessel 125 which is arranged inside a receiving member (box body 124) to which the extensible member 126 is attached.

When a plurality of the switch valves 120 shares the receiving member 121, the receiving member 121 is provided with openings in such a number which is the same as that of the switch valves 120.

The extensible member 116, 126 has one end gas-tightly attached to the circumference of the opening of the receiving member 111, 121 such that it surrounds the opening, and the other end is closed with the enclosure 119, 129; thus, the inner space of the switch valve 110, 120 is hermetically sealed.

The receiving member 111, 121 is fixed, and at rest relative to the outside devices. On the other hand, the enclosure 119, 129 is attached to a moving unit; and when the enclosure 119, 129 is moved up and down by the moving unit; the blocking member 72 moves up and down simultaneously.

At that time, since the extensible member 116, 126 extends and contracts, the inner space of the switch valve 110, 120 is maintained in a state of being blocked from the outer space.

When the enclosure 119, 129 moves, the blocking member 72 also moves with the enclosure 119, 129, so that when the blocking member 72 is connected to the outer device (such as, the discharging unit, the vapor generating unit or the like) via an extensible member such as a bellows, the outside device is prevented from being damaged by absorbing impact which occurs during movement with the extensible member.

When the enclosure 119, 129 moves and the receiving member 111, 121 is fixed, if the connection pipe 78 is provided for the receiving member 111, 121, the connection pipe 78 is at rest relative to the outside device, so that no extensible member needs to be provided between the connection pipe 78 and the outside device.

Even when the connection pipe 78 is provided for the enclosure 119, 129, the outside device is prevented from being damaged, if the connection pipe 78 is connected to the outside device via the extensible member.

In the above discussions, an explanation has been made as to the case in which either one of the enclosure 79, 109, 119, 129 and the receiving member 71, 101, 111, 121 is moved, but the present invention is not limited thereto, and both of the enclosure 79 and the receiving member 71 may be moved. In this case, if both of the connection pipe 78 and the blocking member 72 are connected to the outside devices via the extensible members, the outside devices are prevented from being damaged.

Although the shape of the blocking member 72 is not particularly limited, if the lower end of a wall which constitutes a tube of the blocking member 72 is tapered and sharpened toward the tip, a contact area between the lower end of the blocking member 72 and a surface of the low-melting-point metal 76 becomes smaller, so that when the switch valve 70 is closed, the low-melting-point metal 76 does not fly off.

The blocking member 72 is not limited to the tubular shape, and it may be made in various shapes (such as, a planar shape, a spherical shape or the like) so long as the inner space of the switch valve 70 is able to be separated.

In addition, as shown in FIGS. 3(a) and (b), a projection 74 may be disposed on a bottom face of the receiving member 71 (in this case, the bottom face of the vessel 75) on which the low-melting-point metal 76 is to be placed, so that the low-melting-point metal 76 is placed in a ring-shaped space between an inner wall face of the vessel 75 and a lateral face of the projection 74 in order to have the low-melting-point metal 76 in a shape of a ring.

In this case, the outer circumference and the inner circumference of the blocking member 72 are not only smaller than the opening of the vessel 75 but also larger than the tip of the projection 74; and the outer circumference and the inner circumference are located immediately above an area between the edge of the opening of the vessel 75 and the outer circumference of the tip of the projection 74.

Since the lower end of the blocking member 72 faces the surface of the ring-shaped low-melting-point metal 76 throughout the entire circumference, the entire circumference of the lower end closely contacts the surface of the low-melting-point metal 76 in the closed state. When the projection 74 is disposed and the low-melting-point metal 76 is made ring-shaped, the required amount of the low-melting-point metal 76 may be made smaller and the heating efficiency of the low-melting-point metal 76 may be higher.

Figure 8A:
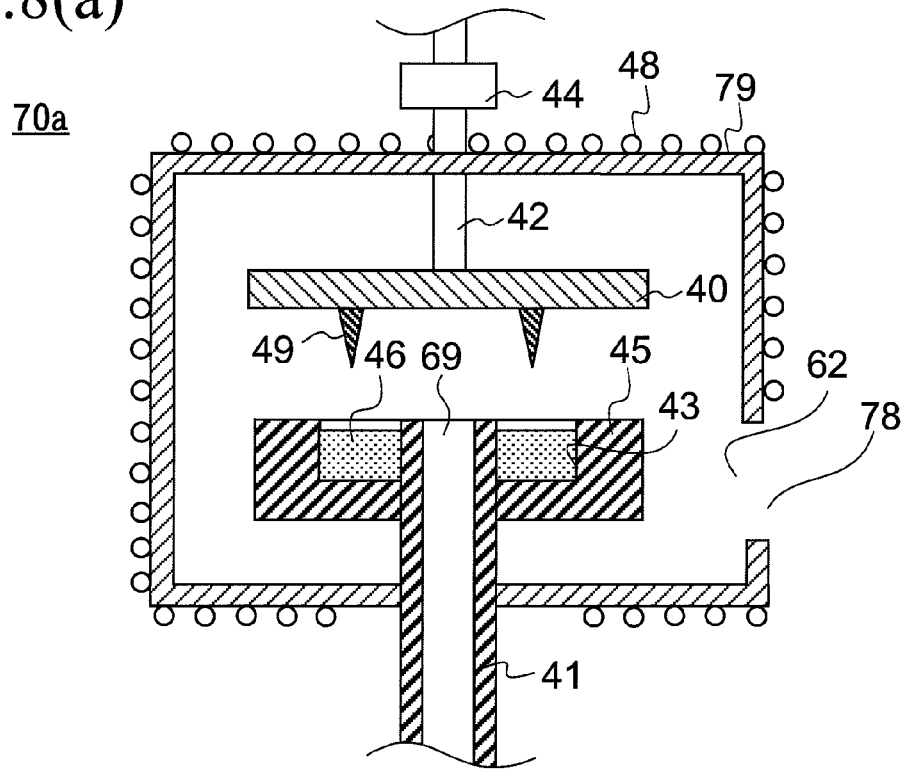
FIGS. 8(*a*) and (*b*) are drawings for illustrating another embodiment of the present invention.
Figure 8B:
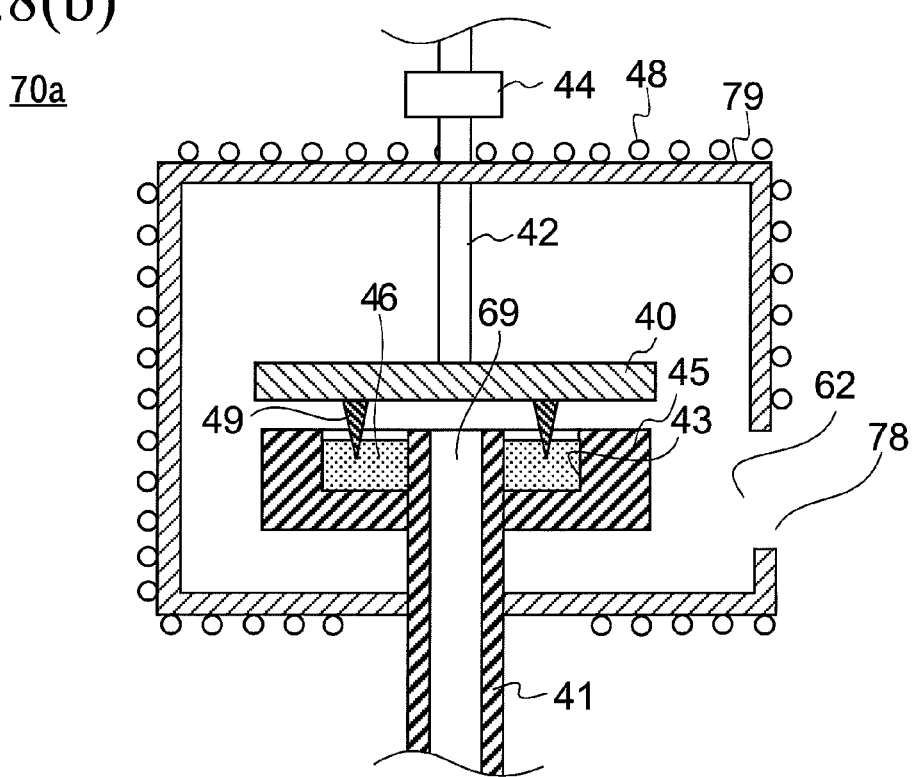

In the above explanation, although the on-off opening 69 is arranged in the lower end of the pipe as shown in FIGS. 8(a) and (b), the on-off opening may be constituted by an opening at the upper end of a pipe 41 which is inserted through a bottom face of a vessel 43, wherein a blocking member 49, made of a tubular projection which is provided on a bottom face of a lid portion 40, is moved up and down, so that the on-off opening 69 surrounded by the vessel 43 throughout the entire circumference may be opened and closed.

This switch valve 70a with the on-off opening 69 arranged at the upper end of a pipe 41 will be explained. In reference to FIGS. 8(a) and (b), in the switch valve 70a, a vessel body 45 is arranged in an enclosure 79 acting as a housing. The pipe 41 is inserted into the vessel body 45 from the side underneath the bottom face of the vessel body 45, such that the pipe and the bottom face of the vessel body 45 is liquid-tight, and the pipe 41 is projected above the bottom face of the vessel body 45.

The outer circumference of the pipe 41 is spaced away from the inner circumferential face of the vessel body 45; and therefore, a portion of the pipe 41 above the bottom face of the vessel body 45 is encompassed with a ring-shaped vessel 43 which is constituted by the inner circumferential face and the bottom face of the vessel body 45 and the outer circumferential face of the pipe 41.

A low-melting-pint metal 46 is placed inside this ring-shaped vessel 43; and the low-melting-point metal 46 is heated to a temperature of its melting point or higher to be melted with a heater 48 arranged outside the enclosure 79.

A lid portion 40 is arranged above the vessel 43.

The bottom face of the lid portion 40 faces the vessel 43, and a tubular blocking member 49 made of a ring-shaped projection is formed on the bottom face. The lid portion 40 and the blocking member 49, which are not gas-permeable, gas-tightly connected to each other.

A moving shaft 42 is connected to the lid portion 40, and the moving shaft 42 is extended gas-tightly to the outside of the enclosure 79, and connected to a motor 44. When the motor 44 is actuated, the lid portion 40 and the blocking member 49 are moved up and down via the moving shaft 42.

The enclosure 79 is provided with a connection opening 62 which is to connect to either one of the vapor generating unit 20 and the discharging unit 50. The lower end of the pipe 41 is extended in a gas-tightly manner to the outside through the wall face of the enclosure 79; and the upper end of a portion constituting the vessel 43 is designed as an on-off opening 69, which is connected to either the vapor generating unit 20 or the discharging unit 50 which is not connected to the connection opening 62.

When the blocking member 49 and the lid portion 40 are spaced away from the vessel 43 and the melted low-melting point metal 46, the connection opening 62 and the on-off opening 69 are connected within the enclosure 79, and therefore the vapor generating unit 20 and the discharging units 50 are connected.

When the lid portion 40 descends so that the blocking member 49 contacts and is immersed into the low-melting-point metal 46 which is melted along the entire circumference of the on-off opening 69, the on-off opening 69 is covered with the lid portion 40 and the blocking member 49, so that the connection opening 62 and the on-off opening 69 are blocked from each other.

It is as applicable as the above-explanation not to move the lid portion 40 but to move the ring-shaped vessel 43 and the pipe 41, as long as the blocking member 49 does not contact the bottom face of the vessel body 45.

In the present invention, the low-melting-point metal 46 is not particularly limited, as long as a low-melting-point metal 46 having the melting point temperature which is less than the decomposition temperature of a gas to be transferred (the vapor of the vapor deposition material, for example) is used. If the low-melting-point metal 46 is heated so as to be melted at a temperature which is less than the decomposition temperature, the gas does not decompose even when it contacts with the low-melting-point metal 46.

Next, other embodiments of the present invention will be explained.

Figure 9:
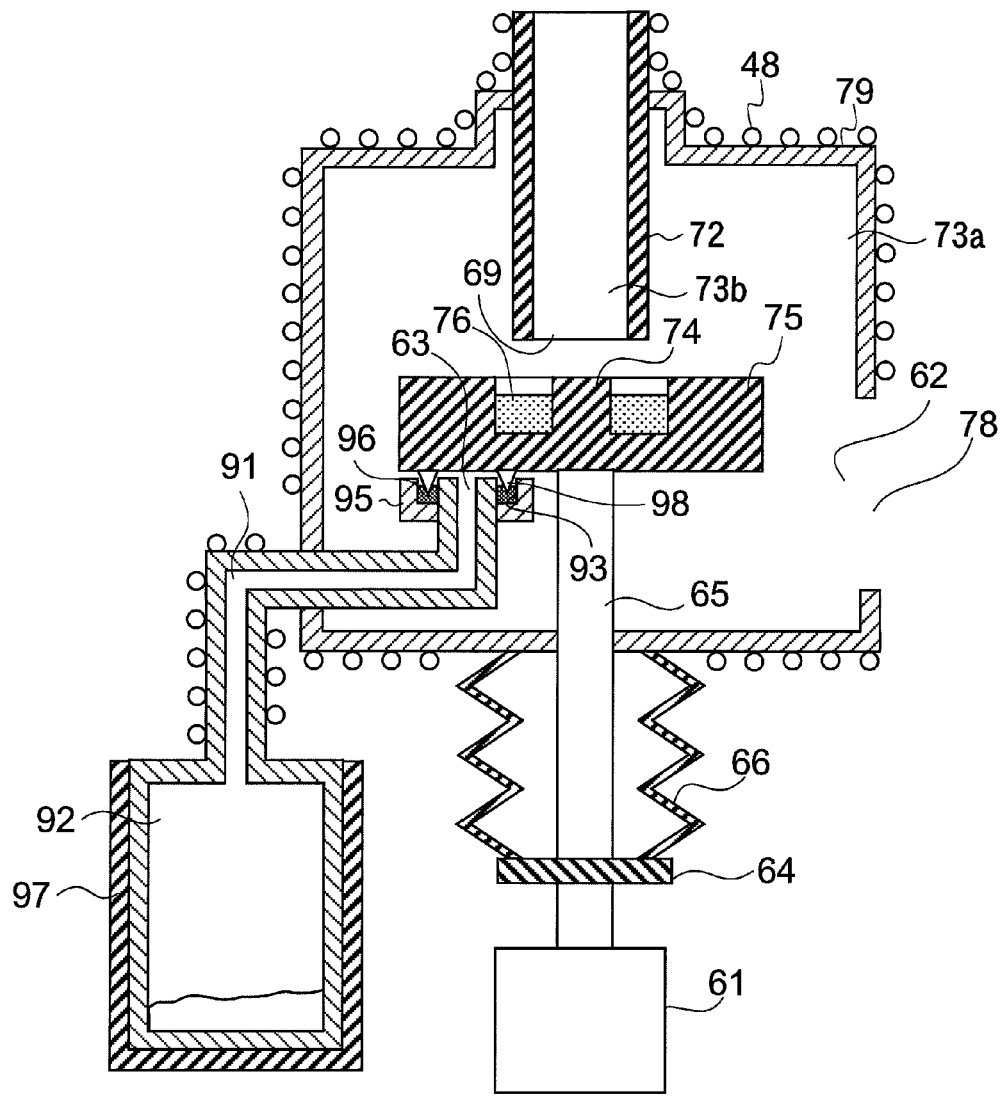
FIG. 9 is a drawing for illustrating an embodiment of the present invention in which a cooling unit is connected (with a cooling chamber being blocked).
Figure 10:
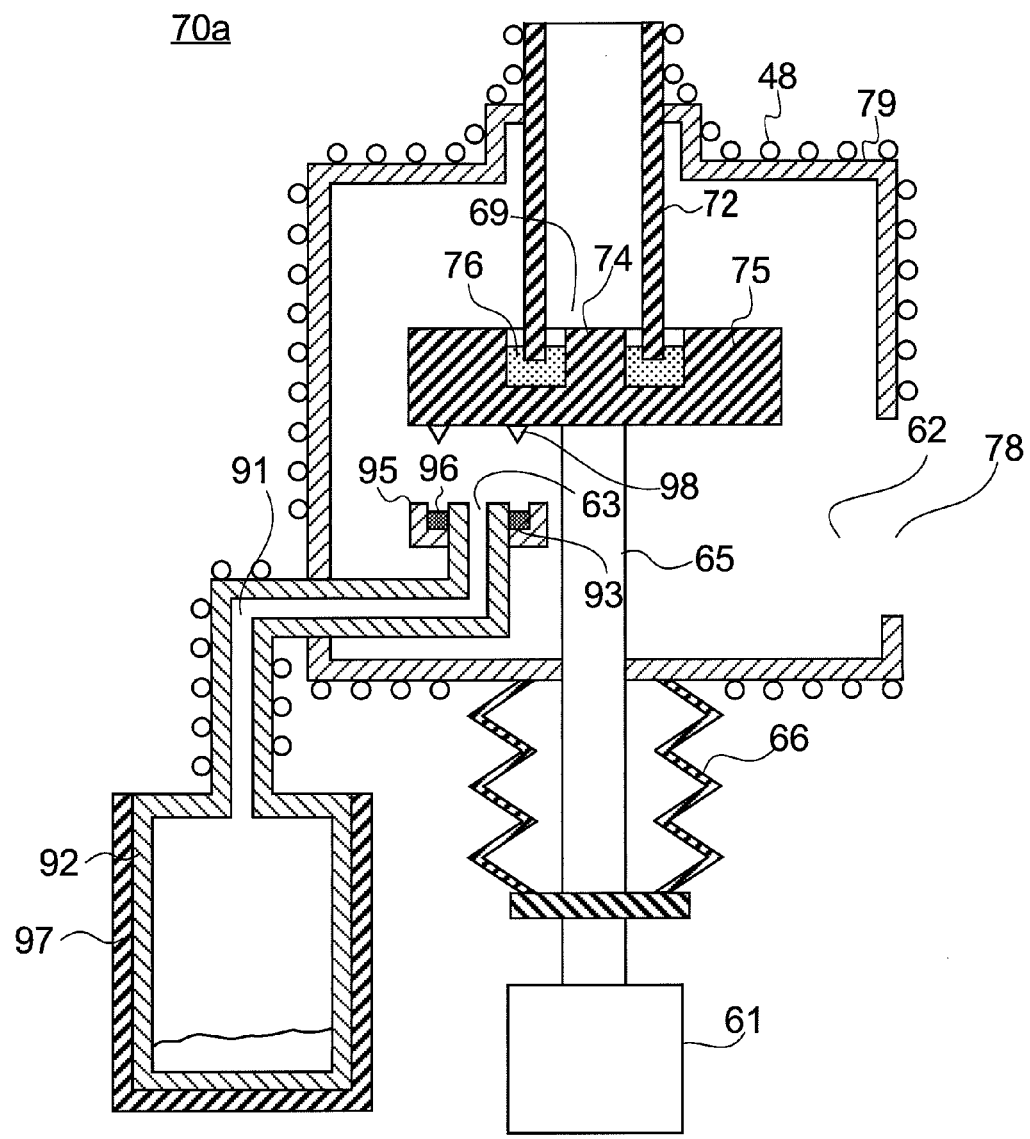
FIG. 10 is a drawing for illustrating an embodiment of the present invention in which the cooling unit is connected (with the cooling chamber being connected).

In FIGS. 9 and 10, a reference numeral 70b denotes another switch valve of the present invention.

Inside an enclosure 79, a first vessel 75 is arranged.

A pipe is gas-tightly inserted into the enclosure 79 above the first vessel 75; and assuming that a lower portion of this pipe is a first blocking member 72, the first blocking member 72 is arranged above the first vessel 75.

The first vessel 75 is gas-tightly attached to a moving unit 61 (such as, a motor via a supporting shaft 65), and is designed to be able to move up and down relative to the first blocking member 72.

A low-melting-point metal 76 is placed inside the first vessel 75. The low-melting-point metal 76 is melted; and in a non-contact state in which the first blocking member 72 is spaced away from the melted low-melting point metal 76, as shown in FIG. 9, a connection opening 62 provided in the enclosure 79 is communicated with a first on-off opening 69 surrounded by the blocking member 72.

As shown in FIG. 10, when the first blocking member 72 contacts the low-melting-point metal 76 which is melted inside the first vessel 75 and is immersed into the low-melting-point metal 76, the connection opening 62 and the first on-off opening 69 is blocked from each other.

A vessel body 95 is arranged under the first vessel 75. Similar to the switch valve 70a shown in FIGS. 8(a) and (b), a ring-shaped second vessel 93 is formed in a vessel body 95 by connecting a pipe 91 to its bottom face.

Assuming that an opening at the upper end of the pipe 91 which is inserted through the bottom face is a second on-off opening 63, the second on-off opening 63 is surrounded by a second vessel 93.

A second tubular blocking member 98 made of a ring-shaped projection is formed in a gas-tightly manner on the back side of a bottom face of the first vessel 75 which is directed vertically downward.

The second blocking member 98 is located above the second vessel 93, and it is constructed such that the second blocking member 98 is inserted into and pulled away from the second vessel 93 by the up and down movement of the first vessel 75.

A low-melting-point metal 96 having the same composition as that of the low-melting-point metal 76 inside the first vessel 75 is also placed in the second vessel 93, and melted by heating.

When the second blocking member 98 contacts the low-melting-point metal 96 and is immersed thereinto by inserting the second blocking member 98 into the second vessel 93, the second on-off opening 63 is closed by both of the second blocking member 98 and a lid portion, which is the first vessel acting as the lid portion. At this time, the first on-off opening 69 is opened, and the first on-off opening 69 is connected to a connection opening 62.

In a state such that the first vessel 75 moves up and the first on-off opening 69 is closed, a non-contacted state appears in which the second blocking member 98 is pulled away from the inner portion of the second vessel 93 and the second blocking member 98 is spaced away from the low-melting-point metal 96, so that the second on-off opening 63 is opened. At this time, the first on-off opening 69 is closed, and the second on-off opening 63 is connected to the connection opening 62.

The pipe 91 having one end designed as the second on-off opening 63 is connected to a cooling chamber 92 at the other end. The cooling chamber 92 is provided with a cooling unit 97 on its outer circumference to be cooled. The connection opening 62 is connected to the vapor generating unit 20, and the first on-off opening 69 is connected to the discharging units 50, so that when the first on-off opening 69 is closed and the second on-off opening 63 is opened, the vapor generating unit 20 and the cooling chamber 92 are connected, and the vapor of the organic compound which is produced in the vapor generating unit 20 is led into the cooling chamber 92, and is cooled with the cooler 97 and forms a precipitate on a wall face of the cooling chamber 92. When the vapor generating unit is connected to the cooling chamber 92 in removing a residual vapor therein, the residual vapor can be removed by precipitation.

Further, if it is feared that a gas is precipitated like the vapor of the vapor deposition material, the gas is precipitated on a surface of the low-melting-point metal 76 if the low-melting-point metal 76 is at a temperature which is less than the precipitation temperature of the gas. In such a case, a metal having the melting point temperature which is less than the precipitation temperature of the gas is used as the low-melting-point metal 76, and the low-melting-point metal 76 is melted by heating to a temperature beyond the precipitation temperature.

For example, when the vapor deposition material is an organic material for an organic EL element, one or more kinds of metals selected from the group consisting of In (melting point: 156° C.), Sn (melting point: 232° C.) and an InSn alloy are used as the low-melting-point metal 76, and the low-melting-point metal 76 is melted by heating it to 240° C. or more to 400° C. or less.

If the receiving members 71, the vessels 75, 93 and the blocking members 72, 98 are made of a heat-resistant material, which does not melt at the above-discussed heating temperature, such as a stainless steel, they are free from deformation or melting when the low-melting-point metals 76, 96 are melted.

The installation places of the switch valve 70, 70*a*, 70*b* are not particularly limited, and the switch valves 70, 70*a*, 70*b* may be arranged inside the film forming chamber 11; alternatively, they may be arranged inside a vacuum chamber different from the film forming chamber 11.

What is claimed is:

1. A switch valve, having an enclosure, a connection opening, a first on-off opening and a second on-off opening, the connection opening and the first and second on-off openings being for respective communication with an interior and an exterior of the enclosure, the switch valve being made switchable between a first state, in which a gas is able to pass through the interior of the enclosure between the first on-off opening and the connection opening, with the second on-off opening closed, and a second state, in which the gas is able to pass through the interior of the enclosure between the second on-off opening and the connection opening, with the first on-off opening closed, the switch value comprising:

a first vessel and a second vessel, disposed inside the enclosure, and a first tubular blocking portion and a second tubular blocking portion, disposed inside the enclosure, which is able to be inserted into and pulled away respectively from the first and second vessels, wherein the melted low-melting-point metal is disposed in the first and second vessels, wherein the first vessel is designed to be able to move up and down inside the enclosure, wherein when the first vessel is located at a lower part inside the enclosure, the first blocking portion is pulled away from the first vessel, and the second blocking portion is inserted into the second vessel to contact the melted low-melting-point metal, so that the second on-off opening is blocked by the second blocking portion, thereby it becoming the first state, and wherein when the first vessel is located at an upper part inside the enclosure, the first blocking portion is inserted into the first vessel to contact the melted low-melting-point metal, so that the first on-off opening is blocked by the first blocking portion, and the second blocking portion is pulled away from the second vessel, thereby becoming the second state.

2. The switch valve as set forth in claim 1, wherein the second blocking portion is provided under the first vessel, and wherein an opening of an upper end of a pipe provided in the second vessel is the second on-off opening.

3. The switch valve as set forth in claim 1, further comprising a heating means to heat the low-melting-point metal.

4. The switch valve as set forth in claim 3, wherein the low-melting-point metal is at least one metal selected from the group consisting of indium, tin, and an indium tin oxide alloy.

* * * * *